Patented Oct. 23, 1945

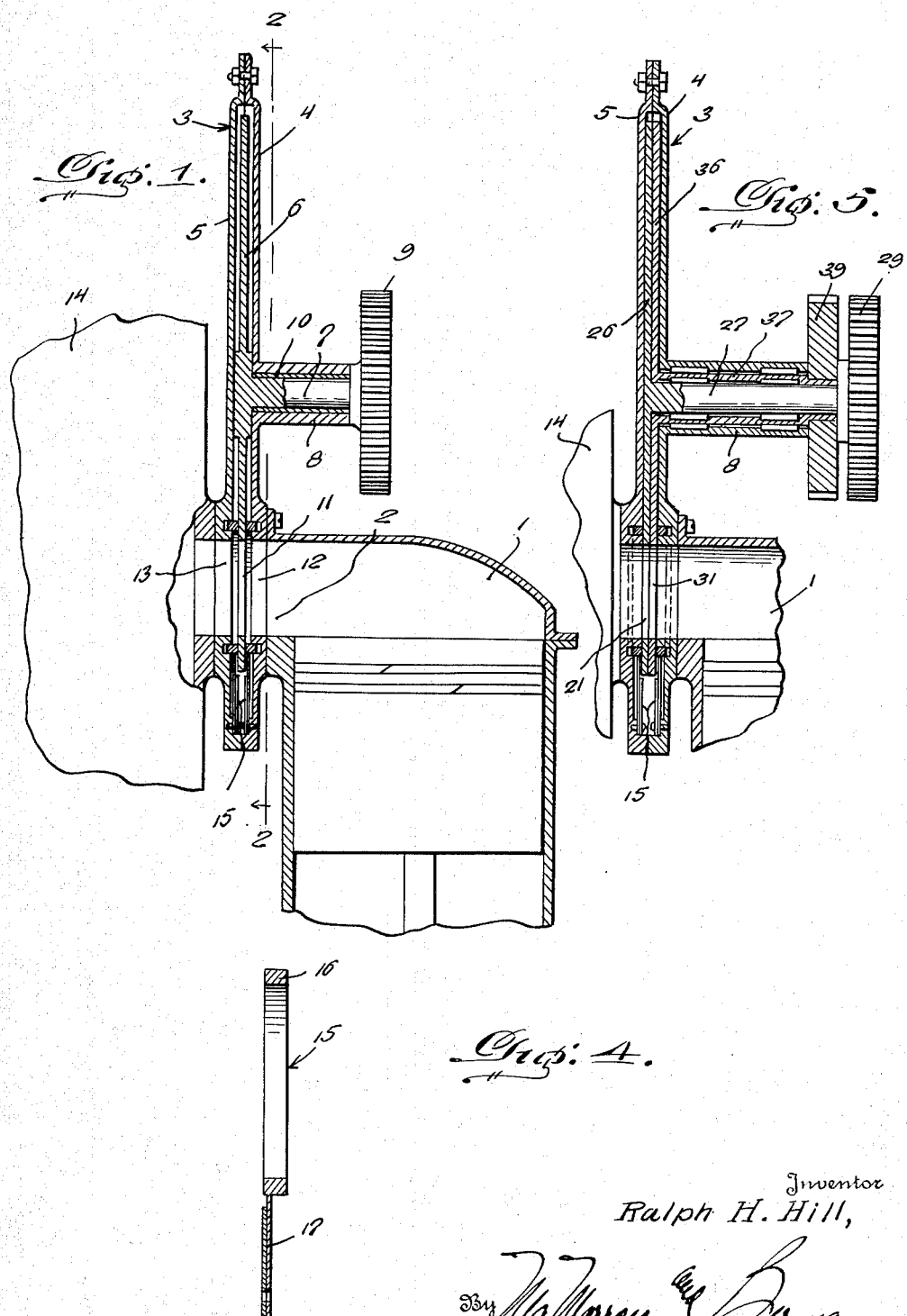
Oct. 23, 1945.   R. H. HILL   2,387,397
ROTARY DISK VALVE
Filed Feb. 13, 1945   2 Sheets-Sheet 1
Inventor
Ralph H. Hill,
Attorneys

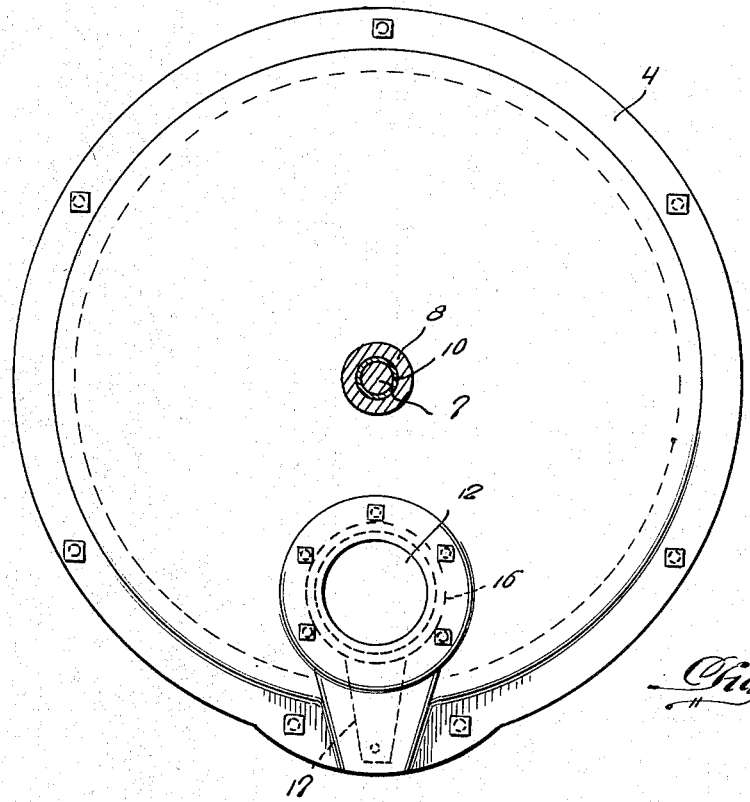
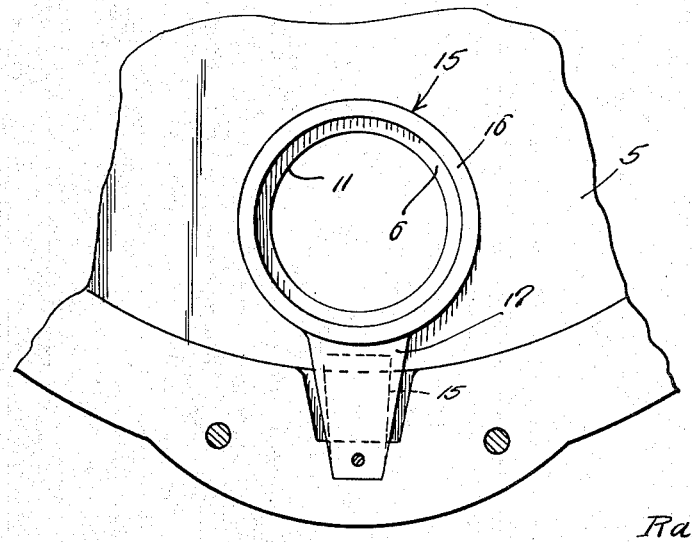

2,387,397

UNITED STATES PATENT OFFICE 2,387,397

ROTARY DISK VALVE

Ralph H. Hill, Flint, Mich.

Application February 13, 1945, Serial No. 577,599

4 Claims. (Cl. 123—190)

This invention relates to rotary disk valves, and more particularly to rotary disk valves for gas engines for introducing an explosive gas mixture into the explosion chamber of a gas engine.

A main object of this invention is to provide an improved rotary disk valve structure wherein leakage effects due to expansion and contraction of the valve disk as a result of temperature changes are minimized.

A further object of this invention is to provide a simple temperature compensating means for maintaining a constant seal at the rotary disk of a disk valve type of gas engine for preventing leakage of fuel through the valve.

Further objects of the invention will appear from the following description and claims, and from the accompanying drawings, wherein:

Figure 1 is an elevational view, partly in cross-section, of a portion of a gas engine equipped with a rotary disk valve according to this invention.

Figure 2 is a cross-sectional view taken on line 2—2 of Figure 1.

Figure 3 is a detail view showing one of the valve-sealing rings in operative position within a valve according to this invention.

Figure 4 is a cross-sectional detail view taken through the central plane of a sealing ring according to this invention.

Figure 5 is a view similar to Figure 1 but disclosing a modified structure of a rotary valve in accordance with this invention.

In gas engines of the rotary valve type, intake and exhaust are controlled by valves which are in the form of rotary disks suitably driven and timed with respect to the pistons of the engine. Various methods have been employed for mounting the valves for preventing leakage past the valves during that portion of the cycle when the valve port is required to be closed. The sealing structures heretofore employed have been found to be unsatisfactory for preventing gas leakage, and one of the main sources of difficulty in providing a satisfactory seal arises from the fact that the valve disk contracts in thickness on cooling and expands on heating so that uniform sealing pressure of the sealing spring or gasket is not obtained over the range of temperatures which the valve undergoes in the course of its operation. The leakage is most troublesome when the valve is cold, since in that condition the disk is in its state of minimum thickness.

Referring to the drawings, a structure is disclosed which is designed to overcome leakage effects caused by temperature changes and which may be readily employed to minimize valve leakage over the range of operating temperatures of the valve. In Figure 1, the piston chamber of a gas engine is designated by 1, said piston chamber being provided with a gas intake opening 2. Appropriately secured to piston chamber 1 at opening 2 is a valve housing 3 comprising a first element 4 and a second element 5, said elements forming a compartment containing a valve disk 6. Said valve disk 6 is provided with an axial shaft 7 extending through a tubular axial extension 8 of first element 4 and provided at its end with a gear 9. A suitable bearing sleeve 10 is provided between shaft 7 and extension 8.

Valve disk 6 is formed with an aperture 11 of circular or other desired shape, and corresponding registering apertures 12 and 13 are provided in the respective elements 4 and 5. Apertures 11, 12 and 13 are arranged for registry at one position of rotation of disk 6 to admit the gaseous fuel mixture from intake manifold 14 to piston chamber 1 of the engine.

Gear 9 is actuated by a suitable driving means which is appropriately timed with respect to the cycle of operation of the engine to provide registry of apertures 11, 12 and 13 at the proper point of the cycle to admit the gaseous fuel mixture into piston chamber 1. Suitable igniting means, not shown, also appropriately timed, is provided in piston chamber 1 for exploding the mixture.

In order to provide a proper seal between elements 4 and 5 and disk 6 for the non-registering positions of orifice 11 with respect to orifices 12 and 13, to prevent leakage of the gaseous fuel mixture from manifold 14 to piston chamber 1 during undesired portions of the operating cycle, sealing ring elements 15 are provided in the valve housing. Each sealing ring element comprises a rim portion 16 of rectangular cross-section adapted to be snugly seated in an annular groove provided in the faces of each of the respective elements 4 and 5 opposing disk 6, said grooves being concentric with the valve apertures. Each rim portion 16 is supported on a bimetal spring arm 17 secured to the respective element 4 or 5 to provide a normal spring bearing pressure of rim 16 on disk 6. The bimetal spring arm 17 of each sealing ring element is designed to provide maximum warp toward disk 6 at low temperatures and to thereby maintain sealing pressure of rim 16 against disk 6 when the valve is cold and in its condition of minimum thickness. When the valve temperature rises and the thickness of disk 6 increases due to thermal expansion, the warp of bimetal spring arm 17 for each element 4 and 5 diminishes sufficiently to maintain substantially the same sealing pressure of rims 16 on disk 6 as existed at the cold starting condition. It is then seen that a substantially constant pressure seal is obtained regardless of temperature conditions of the valve and that in this respect the operating performance of the gas engine will be more or less independent of temperature.

Due to the improved efficiency of the seal at low temperatures, the fuel consumption when the engine is cold will be less wasteful due to reduction of leakage past the valve. The substantial constancy of sealing pressure provided by the thermostat spring arms 17 will minimize wear on the valve discs, which otherwise might be excessive if heavy normal spring pressure was employed to reduce fuel leakage at low temperatures.

In the embodiment of Figure 5, a double valve disk is employed wherein each valve disk rotates in an opposite direction with respect to the other. As in the embodiment of Figure 1, a valve housing 3 is provided and element 4 carries an integral axial sleeve 8. A first valve disk 26, provided with an aperture 21, is further provided with an axial shaft 27 carrying at its end a first gear 29. A second valve disc 36, provided with an aperture 31, is further provided with an axial sleeve 37 interposed between shaft 27 and sleeve 8 and having secured to its end a second gear 39. Appropriate bearing elements are provided between sleeves 8 and 37 and between sleeve 37 and shaft 27. Gears 29 and 39 are driven in opposite directions by appropriately timed driving means synchronized with the engine and are adjusted so that the respective orifices will be in proper registry to allow passage of the gaseous fuel mixture from intake manifold 14 to piston chamber 1 at the correct point in the engine cycle. As in the embodiment of Figure 1, thermostatic sealing ring elements 15 are employed to exert a substantially constant sealing pressure on the disks to minimize gas leakage past the valve disks when the valve is cold.

In the embodiment of Figure 5, the spring pressure of the sealing ring elements serves to press the valve disks together to minimize passage of fuel mixture between the disks, but is insufficient to create undue frictional drag between them.

While certain specific embodiments of rotary disk valves for gas engines have been disclosed in the foregoing description, it will be understood that various modifications within the spirit of the invention will occur to those skilled in the art. Therefore, it is intended that no limitations be placed on the invention other than as defined by the scope of the appended claims.

What is claimed is:

1. A valve for a gas engine comprising a housing, a disk member mounted for rotation within said housing, said housing comprising a first wall and a second wall, a first aperture formed in said first wall, a second aperture formed in said second wall in registry with said first aperture, a third aperture formed in said disk member adapted to register with said first aperture, and said second aperture in one position of rotation of said disk member, a first annular rectangular groove in said first wall concentric with said first aperture, a first annular ring member of rectangular cross-section snugly fitting said first annular groove and adapted to bear on said disk member, a second annular rectangular groove in said second wall concentric with said second aperture, a second annular ring member of rectangular cross-section snugly fitting said second annular groove and adapted to bear on said disk member, a resilient support member for each of said annular ring members, each resilient support member comprising a bimetal leaf spring secured at one end to said housing and at the other end to a ring member and formed and arranged to provide a substantially constant bearing pressure of said ring member against said disk member over the range of operating temperatures of said valve.

2. In a valve for a gas engine, a housing comprising a pair of substantially parallel walls, a disk member mounted for rotation within said housing in a plane parallel to said walls, registering apertures formed in said walls, an aperture provided in said disk member adapted at times to register with said wall apertures, sealing gasket means provided between said wall apertures and said disk member, and thermostatic means for maintaining the effective sealing pressure of said sealing gasket means on said disc member substantially constant over the range of operating temperatures of said valve.

3. In a valve for a gas engine, a housing comprising a pair of substantially parallel walls, disk means mounted for rotation within said housing in a plane substantially parallel to said walls, registering apertures formed in said walls, aperture means provided in said disk means adapted at times to register with said wall apertures, sealing gasket means provided between the respective walls and the disc means adapted to exert a normal sealing pressure between each wall and the opposing surface of the disc means to substantially seal each wall aperture with respect to said disk means, and thermostatic means adapted to maintain said sealing pressure substantially constant over the range of operating temperatures of said valve.

4. The structure of claim 3, and wherein said thermostatic means comprises a bimetal leaf spring for each wall aperture, one end of said leaf spring being secured to said housing and the other end of said leaf spring being secured to a portion of the sealing gasket means, said bimetal leaf spring being formed and arranged to warp responsive to low temperatures of the valve in a direction urging said portion of the sealing gasket means toward the disk means.

RALPH H. HILL.